US007017016B2

(12) United States Patent
Chujo et al.

(10) Patent No.: US 7,017,016 B2
(45) Date of Patent: Mar. 21, 2006

(54) DISTRIBUTED PROCESSING SYSTEM

(75) Inventors: Yoshihisa Chujo, Aichi (JP); Toshihiko Yaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 725 days.

(21) Appl. No.: 09/815,056

(22) Filed: Mar. 23, 2001

(65) Prior Publication Data

US 2002/0023156 A1 Feb. 21, 2002

(30) Foreign Application Priority Data

Aug. 16, 2000 (JP) ............................ 2000-246813

(51) Int. Cl.
*G06F 12/00* (2006.01)

(52) U.S. Cl. ....................... 711/147; 711/148; 711/153; 709/201; 709/203; 709/213; 709/214; 709/215

(58) Field of Classification Search ........ 709/200–253; 711/147, 148, 153

See application file for complete search history.

(56) References Cited

U.S. PATENT DOCUMENTS 5,713,013 A * 1/1998 Black ............................ 707/2
5,819,047 A * 10/1998 Bauer et al. ................ 709/229
6,092,163 A * 7/2000 Kyler et al. ................ 711/163

FOREIGN PATENT DOCUMENTS

JP 2000322306 A 11/2000

* cited by examiner

*Primary Examiner*—Nabil El-Hady
(74) *Attorney, Agent, or Firm*—Staas & Halsey LLP

(57) ABSTRACT

A distributed processing system which enables a plurality of computers to make quick access to a shared storage unit. A storage quota management unit manages storage quotas, which limit the total amount of data that each user can store on the shared storage unit. When a write request to the shared storage unit is issued at a certain computer, a user identification unit identifies the requesting user. Then a free quota calculation unit calculates the remaining free storage quota of the identified user. A reserve space allocation unit allocates an appropriate reserve space to the computer according to the remaining free storage quota, allowing the computer to use the allocated reserve space at its discretion to handle the user's data write request.

9 Claims, 8 Drawing Sheets

45b

| GROUP ID | GROUP QUOTA | USER ID | BLOCKS (MAX) | FILES (MAX) |
|---|---|---|---|---|
| G0001 | 55GB | P1001 | 12000 | 4000 |
| | | P1002 | 8000 | 3000 |
| | | . . . | . . . | . . . |
| | | P1100 | 14000 | 6000 |
| G0002 | 85GB | P2001 | 13000 | 5000 |
| | | P2002 | 8000 | 3000 |
| | | . . . | . . . | . . . |
| | | P2100 | 10000 | 3500 |

FIG. 3

DISTRIBUTED PROCESSING SYSTEM

BACKGROUND OF THE INVENTION

1. Field of the Invention

The present invention relates to a distributed processing system, and particularly to a distributed processing system which employs at least one common storage unit being shared by a plurality of computers.

2. Description of the Related Art

The UNIX operating system supports distributed processing environments where a plurality of computers execute related application programs in a distributed manner while sharing necessary computing resources. In such a distributed processing system, the consistency and integrity of data objects being processed should always be ensured throughout the system. For this reason, it is not desired that the system contains two or more instances of the same data file. This requirement justifies the computers distributed in a system to share a common storage device that stores unique data objects in a centralized way. To satisfy the demands in distributed processing environments, several types of shared file systems have been developed. Such shared file systems employ a single storage device or multiple storage devices divided into physical or logical volumes. In this description, those shared volumes will be referred to hereafter as the "shared storage unit."

In designing such a shared file system for multi-user environments, it is necessary to incorporate an access control mechanism into the system design to prevent a particular group of users from occupying the space of the shared storage unit. To this end, most systems implement the concept of storage quota limits. The storage quota refers to a preallocated amount of storage space authorized to each user by the system administrator, which enables the shared file system to be controlled so that each user will not store excessive amounts of files. It is also possible to assign a storage quota to a group of users, rather than individual users, depending on the requirements of organizational units in a company.

The ideal shared file system mentioned above, however, has not been realized yet. Conventional implementations take a client-server model, in which a plurality of client computers share a common storage device through the intermediary service of a server computer. The next section will discuss the issue of how the storage quotas of users or user groups are controlled in such conventional client-server-based systems.

FIG. 7 is a block diagram of a conventional client-server system. Although only three computers 10 to 12 are shown, this system is constructed with many computers interconnected by a communication link 13. The computer 10 is coupled to a storage unit 14, in which a file system 14*a* is constructed. To share this file system 14*a* with other computers, the computer 10 employs a server subsystem 10*a* which serves remote client subsystems 11*a* and 12*a* in the other computers 11 and 12.

Suppose here that a user is operating the computer 11 in an attempt to store a certain data file to the remote shared file system 14*a*, issuing a write request to the client subsystem 11*a*. In response to this request, the client subsystem 11*a* sends the data file to the server subsystem 10*a* over the communication link 13. The server subsystem 10*a* compares the size of the received data file with the remaining capacity of the user's storage quota. If there is enough free quota, the server subsystem 10*a* supplies the data file to the shared file system 14*a* for storage.

In the above way of file system sharing, the client subsystems 11*a* and 12*a* have to send data files to the server subsystem 10*a* over the communication link 13, upon receipt of a request from a user. This approach, however, has its potential performance bottleneck in the limited throughput of the server subsystem 10*a*, as well as in the limited bandwidth of the communication link 13. Further, simultaneous data write requests from multiple users of the client computers 11 and 12 would contend for the data processing in the server computer 10, which is another contributing factor to the performance degradation.

To solve the above problems, and to provide a higher system throughput, an improved data management system is disclosed in the Unexamined Japanese Patent Publication No. 2000-322306 (Application Filing No. 11-143502). According to this proposed system, the clients are allowed to manage the allocation of shared storage for themselves, on behalf of the server, thus eliminating the need for the server and clients to send messages back and forth to check the availability of free storage blocks. More specifically, each client receives a certain amount of authorized "reserve space" from the server, which can be used at their own discretion, independently of the server's administration. Accordingly, the clients can make direct and quick access to the shared storage unit, without getting permissions from the server.

FIG. 8 shows a typical configuration of the shared storage system outlined above. In this example system, a plurality of computers 20 to 22 on a common communication link 23 are allowed to make direct access to a shared file system 25*a* in a shared storage unit 25 through another communication link 24. One computer 20 provides administrative services for the shared file system 25*a* by running a shared file management subsystem 20*a* thereon, while the other computers 21 and 22 have their respective shared file access subsystems 21*a* and 22*a* to use the shared file system 25*a*.

Consider here that the user of the computer 21 attempts to store a certain data file to the remote shared file system 25*a*, issuing a write request to the shared file access subsystem 21*a*. In response to the write request, the shared file access subsystem 21*a* examines the size of the data file to be written. If the data file fits the user's reserve area, the shared file access subsystem 21*a* allocates an appropriate part of the reserve area for the data file and directly writes it to shared storage unit 25.

It should be noted here that the storage quotas are assigned to individual users, not to the computers that they are using. In the above-discussed case, the same user may operate another computer 22, or even both computers 21 and 22 simultaneously, to use his/her quota in the shared file system 25*a*. Therefore, the storage occupancy of each user should be checked or controlled always on a total usage basis, and to this end, the shared file management subsystem 20*a* has to serve as a sole manager of user quotas, as in the conventional client-server model.

While the above-described quota control method is simple and easy to implement, the shared file access subsystem 21*a* has to receive access permission from the shared file management subsystem 20*a*, every time the user of the computer 21 attempts to write data to the shared file system 25*a*. This means that the performance of write access would be determined ultimately by the combined performance of the computer 20 and shared file management subsystem 20*a* and the bandwidth of the communication link 23. This performance limitation in the system of FIG. 8 may not be as serious as that in the system of FIG. 7, because the former system does not require a client to transmit data files to the server. However, the interactions between the shared file access subsystems and shared file management subsystem over the communication link 23 are considered to be a non-negligible overhead in the shared file access. This overhead will degrade the performance of the system disclosed in the aforementioned patent publication No. 2000-322306.

Today, the above issues in the conventional processing systems take on greater importance because of the emergence of large-scale distributed processing systems containing hundreds or thousands of computers. Also, the ever-growing Internet access services need high-performance file systems so as to allow a large number of subscribers to use shared storage units. The conventional distributed processing systems, however, cannot satisfy the requirements of users because of the lack of high-speed shared file access capabilities.

SUMMARY OF THE INVENTION

Taking the above into consideration, an object of the present invention is to provide a distributed processing system which controls the users' storage quotas with a minimum system overhead, while taking advantage of the high-speed data access method proposed in the Unexamined Japanese Patent Publication No. 2000-322306.

To accomplish the above object, according to the present invention, there is provided a distributed processing system having a shared storage unit shared by a plurality of computers. This system comprises the following elements: a storage quota management unit which manages a storage quota of each user to limit the total amount of data that each user is allowed to store on the shared storage unit; a user identification unit which identifies a particular user who has issued a write request in an attempt to store data into the shared storage unit; a free quota calculation unit which calculates the amount of free storage quota of the particular user identified by the user identification unit; and a reserve space allocation unit which allocates a reserve space to a requesting computer according to the free storage quota calculated by the free quota calculation unit, the reserve space being an amount of storage space on the shared storage unit which is to be managed at the discretion of the requesting computer.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 shows an example of a management table shown in FIG. 2;

DESCRIPTION OF THE PREFERRED EMBODIMENTS

Preferred embodiments of the present invention will be described below with reference to the accompanying drawings.

Figure 1:
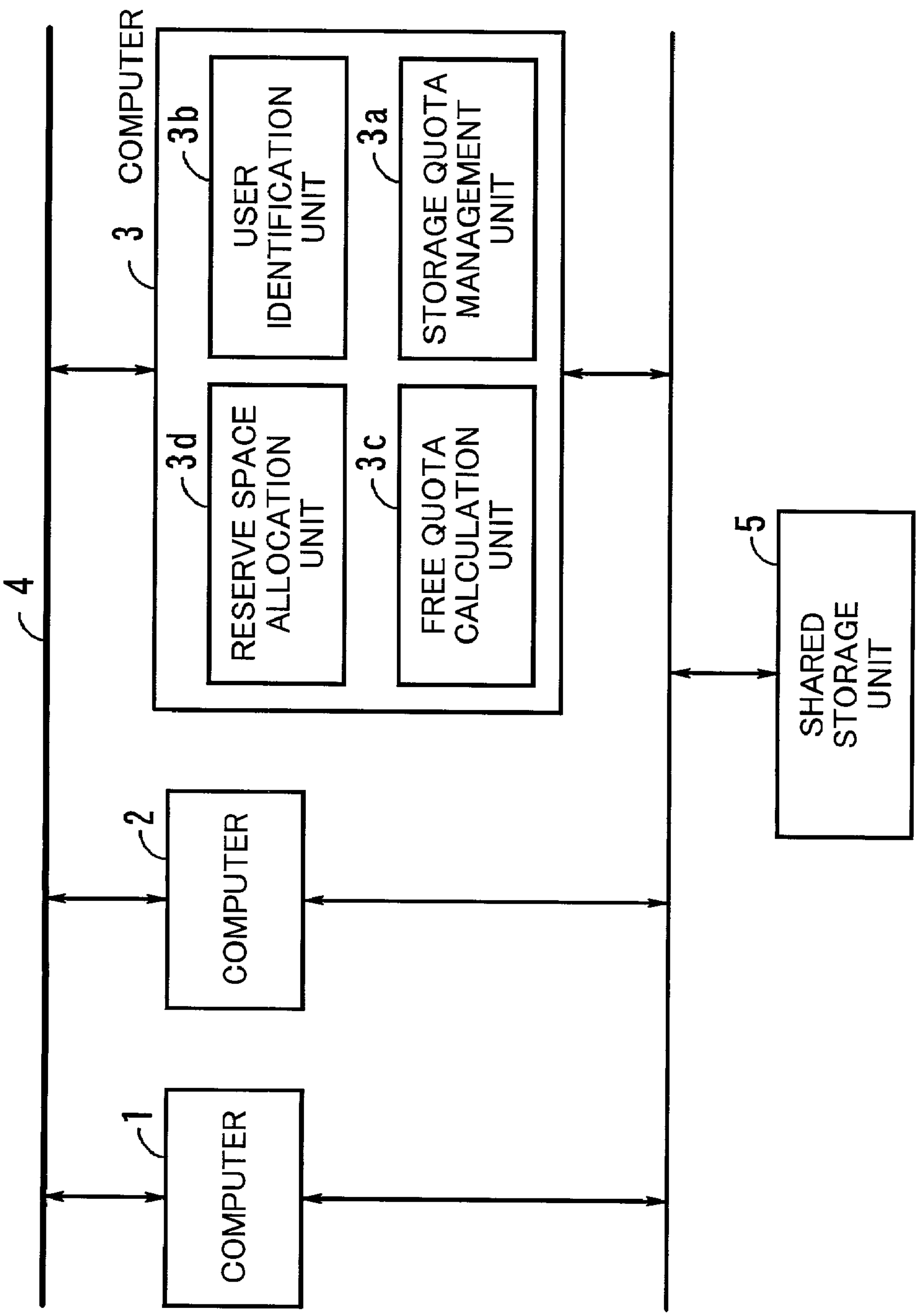
FIG. 1 is a conceptual view of the present invention.

FIG. 1 is a conceptual view of a distributed processing system according to the present invention. This system is constructed with a plurality of computers 1 to 3 interconnected by a communication link 4. The computers 1 to 3 share a storage unit 5 to read and write common files necessary for distributed processing. In this system, the third computer 3 is responsible for an administrative service to provide the other computers 1 and 2 with their reserve areas. According to the present invention, the third computer 3 comprises the following components: a storage quota management unit 3*a*, a user identification unit 3*b*, a free quota calculation unit 3*c*, and a reserve space allocation unit 3*d*.

The functions of the above components are as follows. The storage quota management unit 3*a* manages storage quotas assigned to the users. Here, the term "storage quota" refers to the amount of data that each user can store on the shared storage unit 5. The user identification unit 3*b* identifies a particular user who has issued a write request in an attempt to store data into to the shared storage unit 5. The free quota calculation unit 3*c* calculates the remaining storage quota of the particular user identified by the user identification unit 3*b*. The reserve space allocation unit 3*d* allocates an appropriate reserve space to the computer that the user is currently using, according to the free storage quota calculated by the free quota calculation unit 3*c*, allowing the computer to use the allocated reserve space at its discretion to handle the user's data write requests.

The operation of the proposed processing system will now be described below. Suppose, for example, that a user "John Doe" sitting at the first computer 1 is attempting a data write operation to the shared storage unit 5 for the first time. Generally, in response to such a user's request, the first computer 1 compares the size of the reserve space assigned thereto with the amount of the data that the user is attempting to write. If there is sufficient room in the reserve space, the first computer 1 will execute the requested write operation immediately. If not, the first computer 1 requests the third computer 3 to provide more space to satisfy the capacity requirement. In the present example, the first computer 1 has no reserve space at hand, because it is to spend the user's storage quota for the first time. Therefore, the first computer 1 requests the third computer 3 to supply an appropriate amount of reserve space for the first time. In the third computer 3, the user identification unit 3*b* investigates who is requesting space, and reports the result (e.g., user ID of John Doe) to the storage quota management unit 3*a*. The storage quota management unit 3*a* has the information about the user's quota, the maximum amount of shared space that he/she can use for storage. Supplied with this information from the storage quota management unit 3*a*, the free quota calculation unit 3*c* then calculates the current free space size in the user's storage quota and sends the result (i.e., user's free storage quota) to the reserve space allocation unit 3*d*. The reserve space allocation unit 3*d* then supplies the first computer 1 with an appropriate amount of reserve space out of the user's free storage quota.

When a reserve space is requested, the reserve space allocation unit 3*d* uses the following algorithm to calculate how much of the remaining storage quota can be allocated to the requesting computer. First, when the current usage of the user's storage quota is less than 50 percent, 25 percent of the free quota will be allocated as a reserve space. Second, when the current quota usage is 50 percent or greater, but less than 90 percent, the reserve space size will be determined by dividing the free storage quota by the number of computers involved in the system, which is "three" in the present example. Third, when the current quota usage is 90 percent or greater, no reserve space will be allocated.

As seen from the above, the amount of allocatable reserve space depends on the free storage quota of the user. The proposed way of reserve space calculation reduces the risk of shortage of available quota which may be needed by other computers within the system. Suppose, for example, that the same user John Doe has made a similar request through the second computer 2 this time. If there was little free space remaining in his quota, the third computer 3 would have to ask the first computer 1 to return all or part of its preallocated reserve space. To avoid this time-consuming extra task as much as possible, the reserve space allocation unit 3*d* examines the user's current quota usage to determine the reserve space size. The reserve space passed to the first computer 1 in this way will be managed by the first computer 1 alone, for the purpose of handling data write requests from John Doe.

As described above, the proposed distributed processing system employs a mechanism to provide an appropriate reserve space to each member computer station, depending on each user's current quota usage. This mechanism of the present invention permits the member computers to provide their users with fast access to the shared storage unit, without violating the storage quota limits of individual users.

Figure 2:
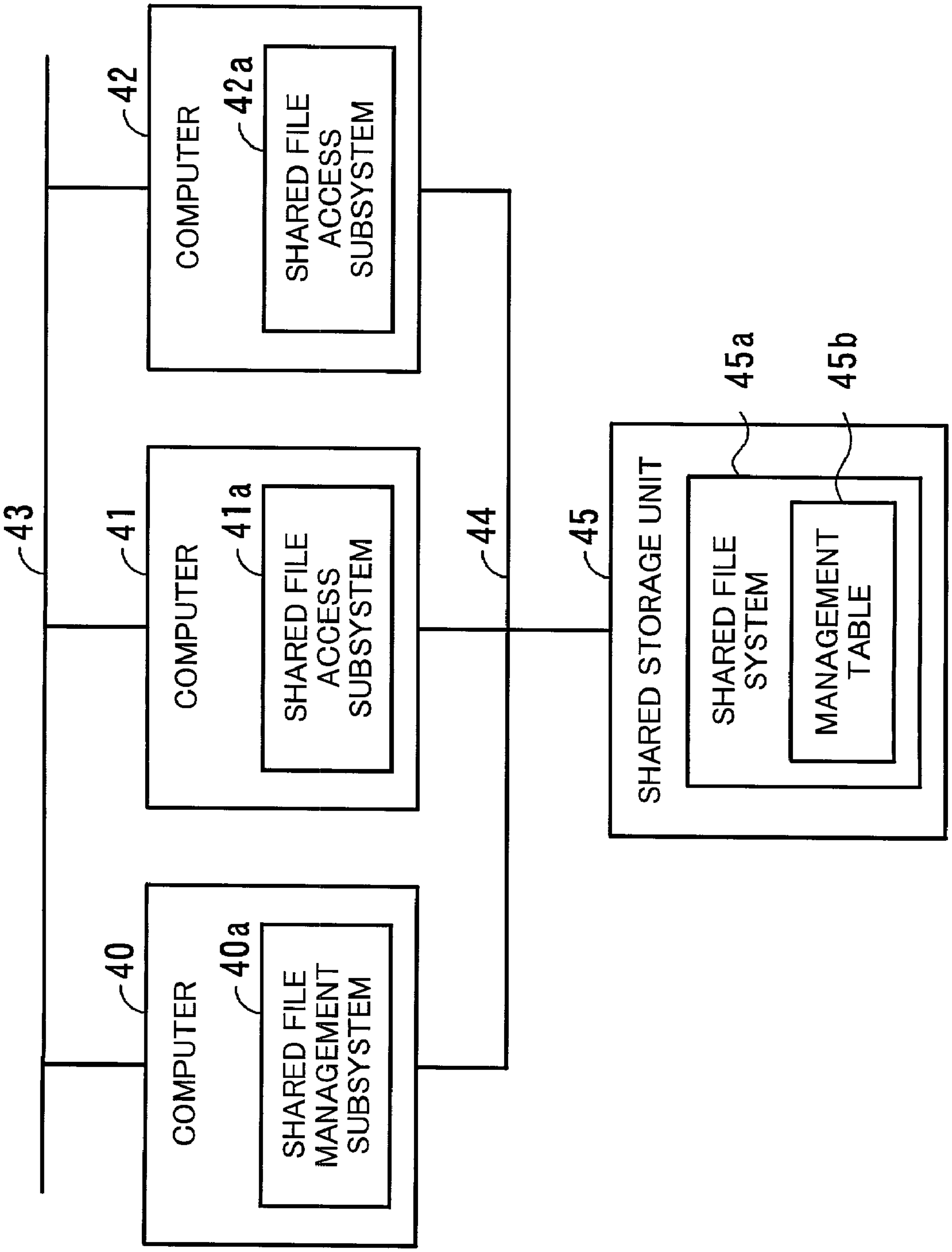
FIG. 2 is a block diagram of an embodiment of the present invention.

Referring next to the block diagram of FIG. 2, a more specific embodiment of the present invention will be explained below. FIG. 2 shows a distributed processing system constructed with three computers 40 to 42 which are interconnected by a communication link 43 and share a storage unit 45 through another communication link 44. The computers 41 to 42 are personal computer-based workstations or other similar platforms. The first communication link 43 may be the Internet, while the second communication link 44 may be a local area network (LAN).

The computer 40 provides administrative services for the shared file system 45*a* by running a shared file management subsystem 40*a* thereon. The other computers 41 and 42 have their respective shared file access subsystems 41*a* and 42*a* to make access to the shared file system 45*a*. The shared storage unit 45 is constructed with one or more hard disk drives, on which the shared file system 45*a* is set up. Besides storing shared files, the shared file system 45*a* maintains a management table 45*b* that contains user IDs, the maximum number of usable storage blocks, and other information to manage user quotas. The function of this system will be briefly explained in the next section, before giving a detailed explanation on the embodiment of FIG. 2.

FIG. 3 shows an example of the management table 45*b* stored in the shared file system 45*a*. This table 45*b* comprises the following data fields: "Group ID," "Group Quota," "User ID," "Blocks(Max)," and "Files(Max)." The Group ID field contains a unique identifier assigned to each group of users. The Group Quota field indicates the amount of storage space in the shared file system 45*a* which is allocated to each user group. In the example of FIG. 3, Group Quotas are represented in gigabytes (GB). The User ID field shows the identifiers of the members belonging to each user group. The Blocks(Max) field gives the maximum number of disk blocks that each user can use for storage. The Files(Max) field indicates the maximum number of files that each user can store in the shared file system 45*a*. The sum of Blocks(Max) values within a group is equal to the size of the Group Quota assigned to that group.

More specifically, the management table 45*b* of FIG. 3 shows that one user group "G0001" is allocated a storage quota of 55 GB, while another group "G0002" is allocated a storage quota of 85 GB. The group "G0001" is defined as a group of users having IDs "P1001" to "P1100," who are authorized to use different amounts of storage space as shown in the Blocks(Max) and Files(Max) fields of the table 45*b*. Similarly, the other group "G0002" is a group of users having IDs "P2001" to "P2100," who are authorized to use different amounts of storage space as shown in the Blocks (Max) and Files(Max) fields of the table 45*b*. As FIG. 3 shows, each user is only allowed to use a limited resource in the shared storage unit 45, and the metrics of his/her storage quota include the maximum number of usable blocks, Blocks(Max), and the maximum number of usable files, Files(Max).

Figure 4:
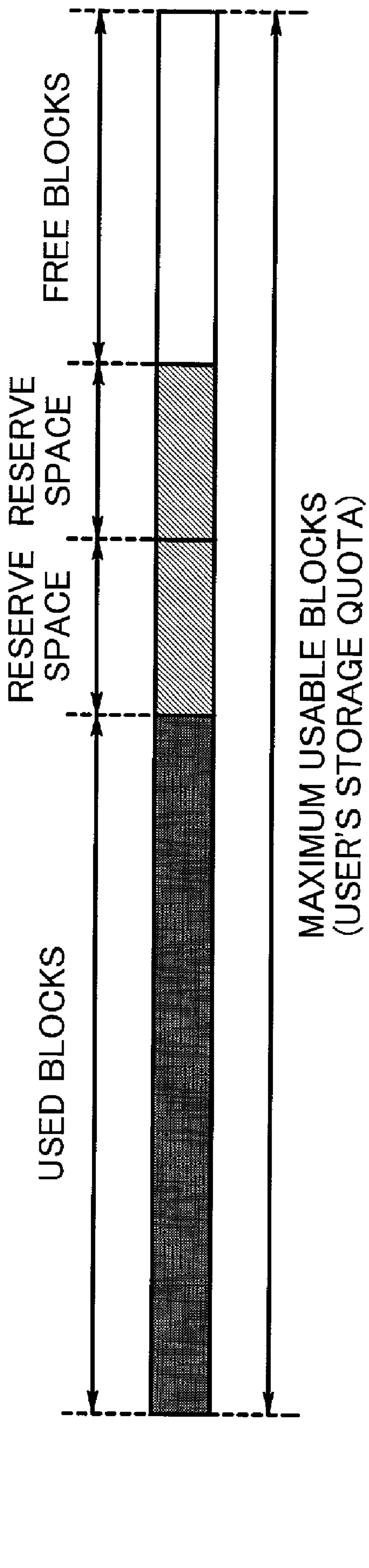
FIG. 4 shows an example of how the storage quota of each user is used.

Referring back to the block diagram of FIG. 2, the shared file management subsystem 40*a* monitors the current usage of the storage quota of each individual user. Generally, each user's storage quota is divided into the following parts: "Used Blocks," "Reserve Space," and "Free Blocks," as shown in FIG. 4 The first part "Used Blocks" represents the storage blocks that are currently in use. The next part "Reserve Space" refers to the blocks that are allocated to the computers. The computers can reallocate their reserve space at their own discretion, when requested by its owner. The right-most part "Free Blocks" refers to unused blocks.

Each computer responds to a write request from a user by allocating a required number of blocks out of the reserve space. As long as the reserve space can serve the requests, the computer need not to consult any administrative entities. When the reserve becomes too small to serve the user requests, or completely exhausted, the computer requests the shared file management subsystem 40*a* to provide an additional reserve space. The shared file management subsystem 40*a* then determines an appropriate reserve size, based on the number of free blocks currently available. More specifically, the following rules will apply to this decision.

Rule (1) If more than 50 percent of the user's storage quota is free, 25 percent of those free blocks are offered to the requesting computer as a reserve space.

Rule (2) If 10 to 50 percent of the user's storage quota is free, and only if the total amount of those free blocks is not less than 50 megabytes (MB), a fraction (1/N) of the free blocks are offered to the requesting computer as a reserve space, where N is the number of computers working in the system.

Rule (3) If the number of free blocks is less than 10 percent of the user's storage quota, and their total capacity falls below 50 MB, no reserve space is offered to the requesting computer. Without reserve spaces at hand, the shared file access subsystems 41*a* and 42*a* need to seek permission from the shared file management subsystem 40*a*, each time they try to execute a new write request from the user.

As seen from the above description, the proposed system determines the amount of allocatable reserve space, depending on the number of free blocks. This feature of the present invention enables the computers to make fast access to the shared file system. The next section will discuss the details of this operation.

Referring back to FIG. 2, consider that the user John Doe is sitting at the second computer 41. He attempts to write a data file with a length of 1000 blocks to the shared file system 45*a*. It is also assumed that this is the very first time for John Doe to make such a write request in the system. This means that the storage quota assigned to John Doe is free in its entirety.

In the above-described situation, the shared file access subsystem 41*a* in the second computer 41 compares the number of required disk blocks (=1000 blocks) with the currently allocated reserve space (=zero). This comparison reveals that the computer 41 has no reserve space at hand, and thus its local shared file access subsystem 41*a* requests the shared file management subsystem 40*a* to provide a sufficient reserve space. Checking a relevant record in response to the request, the shared file management subsystem 40*a* notices that the storage quota of John Doe has never been used. Since the above Rule (1) applies in the present case, the shared file management subsystem 40*a* gives one quarter of his storage quota to the requesting computer 41 as its reserve space. More specifically, John Doe's storage quota (or the maximum number of usable blocks) is 10000 blocks. The second computer 41 then receives a reserve space of 2500 blocks (=10000×0.25), and consequently, the shared file access subsystem 41*a* sees 2500 free blocks in John Doe's reserve space account. To execute the write request, the shared file access subsystem 41*a* consumes 1000 blocks out of the pool of 2500 free blocks.

Suppose that John Doe then makes a similar write request from the third computer 42, specifying a data file with a length of 1100 blocks. This second user request invokes the above-described process again, resulting in a reserve space of 1875 blocks (=7500×0.25) allocated to the shared file access subsystem 42*a* in the third computer 42. The shared file access subsystem 42*a* executes the write request by spending 1100 blocks out of the 1875-block reserve space.

Consider that John Doe subsequently makes still another request in an attempt to write a data file with a length of 500 blocks, using the third computer 42. The remaining reserve space of John Doe in the third computer 42 is 775 blocks at present. The shared file access subsystem 42*a* therefore executes the requested write operation to the shared file system 45*a*, spending 500 blocks out of the reserve space.

Suppose again that John Doe attempts to write yet another data file with a length of 1100 block, using the same third computer 42. Now the remaining reserve space of John Doe in the third computer 42 is only 275 blocks, which is not sufficient for that file. Accordingly, the shared file access subsystem 42*a* requests the shared file management subsystem 40*a* to provide more space. The free storage quota of John Doe is 5625 blocks at the moment, which is still greater than the first threshold of 50 percent. This allows the shared file management subsystem 40*a* to allocate 25 percent of the free storage quota to the computer 42, which is equivalent to 1406 blocks. This reserve space allocation results in a reduced free storage quota of 4219 blocks (=5625−1406), while increasing the reserve space of the third computer 42 up to 1681 blocks (=275+1406). Accordingly, the third computer 42 assigns 1100 blocks to the new data file, using its rich reserve space.

John Doe issues a further data write request to the computer 42 in an attempt to store a 1000-block data file to the shared file system 45*a*. Note that the reserve space of the third computer 42 has decreased to 581 blocks. Because of the shortage, the shared file access subsystem 42*a* requests the shared file management subsystem 40*a* to allocate an additional reserve space. At this moment, the free storage quota of John Doe is 4219 blocks, which falls below the threshold of 50 percent. This condition causes the shared file management subsystem 40*a* to apply the Rule (2) described earlier. That is, the reserve space is obtained by dividing the current free quota (4219 blocks) by the number of working computers (three). This calculation yields a reserve space of 1406 blocks, which is to be allocated to the requesting computer 42. Accordingly, the third computer 42 assigns 1000 blocks to the new data file, spending the increased reserve space.

The above operation is repeated until the free storage quota of John Doe falls below the threshold of 1000 blocks. Once this limit is reached, the shared file management subsystem 40*a* returns no reserve space for further reserve space requests because the Rule (3) applies. Therefore, the requesting computer will have to directly ask the shared file management subsystem 40*a* as to whether each request can be processed. That is, the computer needs permissions of the shared file management subsystem 40*a* to execute a requested write operation.

As described above, the proposed distributed processing system provides each user with a predefined storage quota, i.e., the maximum number of usable blocks on the shared storage space, and it allocates an appropriate amount of reserve space to its member computers on the basis of each individual user's free quota. Compared to a conventional system where users are uniformly assigned a predetermined amount of reserve space, the proposed system has an advantage in that it provides an optimal reserve space. More specifically, according to the present invention, the Rule (2) applies to such situations where the number of free blocks has reduced to a certain level. The system then tries to distribute the remaining free blocks evenly to the member computers working in the system, so as to ensure that every needy computer can obtain a certain amount of reserve space. This algorithm saves the shared file management subsystem from being overwhelmed by excessively frequent interactions with the demanding computers.

It should also be recalled that the Rule (3) applies to such a critical situation where the user has little free blocks in his/her quota. In this case, the shared file management subsystem stops supplying additional reserve spaces, thereby preventing the shared file management subsystem from spending much time to recollect reserve spaces from other computers. This mechanism of Rule (3) will increase the overall performance of the system.

Suppose, for example, that the second computer 41 has a preallocated 2000-block reserve space, while the shared file management subsystem 40*a* has only 500 blocks as the unallocated free storage quota. When the second computer 42 needs a reserve space of 1500 blocks, the shared file management subsystem 40*a* would have to compensate for the shortage by recollecting 1000 blocks back from the second computer 41. The proposed system prevents this processing from happening.

The shared file access and management subsystems are implemented as software programs for computer systems. Referring lastly to the flowcharts of FIGS. 5 and 6, the next section will describe what is encoded in those programs.

Figure 5:
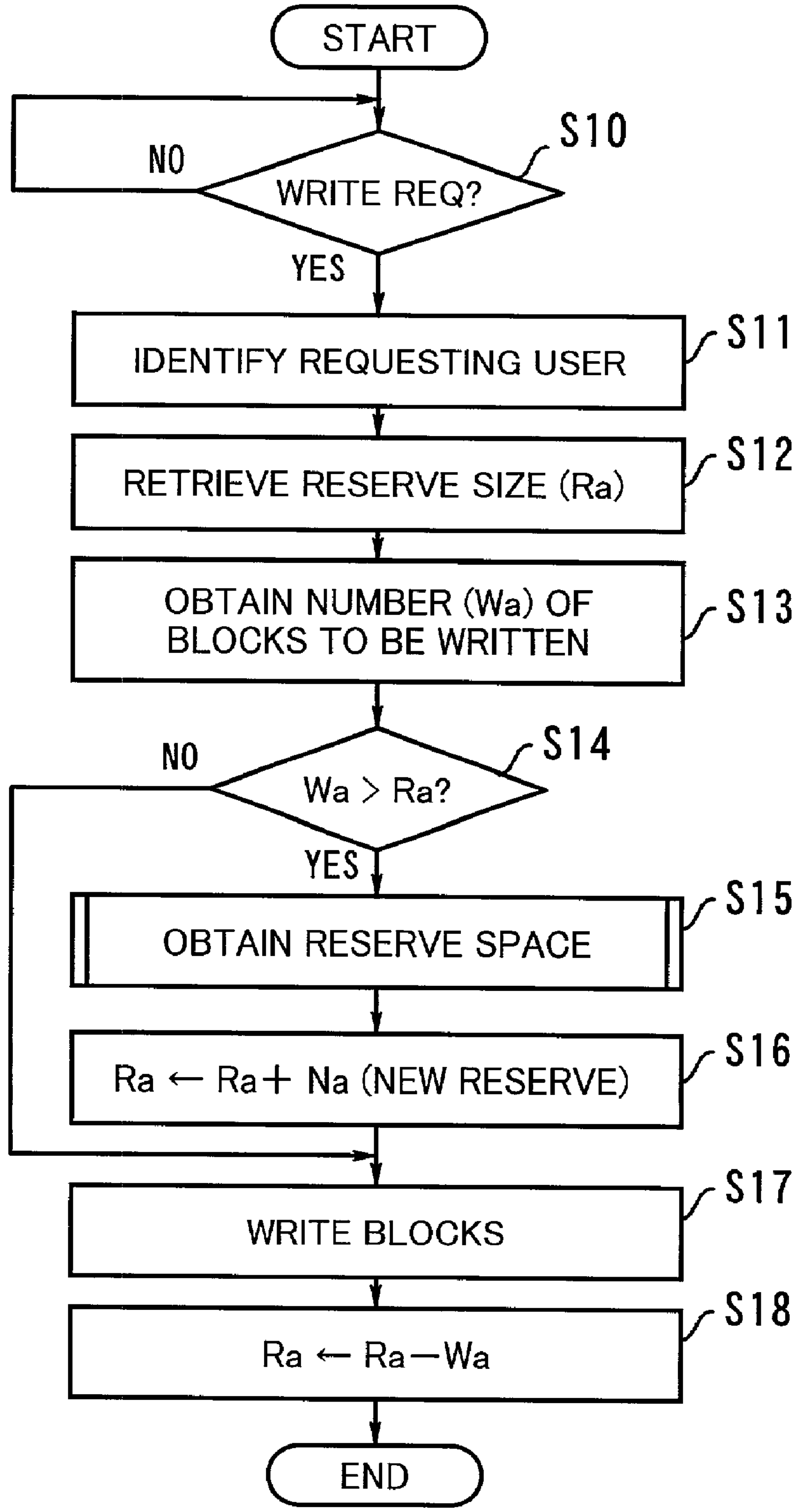
FIG. 5 is a flowchart of a process executed by the shared file access subsystem shown in FIG. 2.

FIG. 5 shows a process executed by a shared file access subsystem when they receive a data write request from a user. This process comprises the following steps.

(S10) The shared file access subsystem in a computer system waits until a write request to the shared file system is received. If a write request is received from a certain user, the process advances to step S11.

(S11) The shared file access subsystem identifies the requesting user.

(S12) The shared file access subsystem retrieves a record of the requesting user identified at step S11, thus obtaining the user's reserve space size Ra. This parameter Ra tells the shared file access subsystem how much of the shared storage space is allocated to the computer.

(S13) Parsing the received write request, the shared file access subsystem obtains the number (Wa) of blocks to be written.

(S14) The shared file access subsystem determines whether Wa (number of blocks) is greater than Ra (reserve space size). If so, the process advances to step S15. If not, the process skips to step S17.

(S15) The shared file access subsystem requests the shared file management subsystem 40*a* to allocate an additional reserve space. The shared file management subsystem 40*a* then returns an appropriate amount (Na) of reserve space. The details of this reserve allocation process will be described later with reference to FIG. 6.

(S16) The shared file access subsystem obtains a new value of the reserve space size by adding Na to Ra and substitutes this new value for the current value Ra.

(S17) The shared file access subsystem writes the data files to the shared file system, charging the used space to the user's reserve space account.

(S18) The shared file access subsystem updates the reserve space size Ra by subtracting Wa therefrom.

Through the above steps, the computer directly writes data files to the shared file system 45*a*, using a preallocated reserve space of the requesting user. If necessary, the computer requests the shared file management subsystem 40*a* to provide an additional reserve space.

Figure 6:
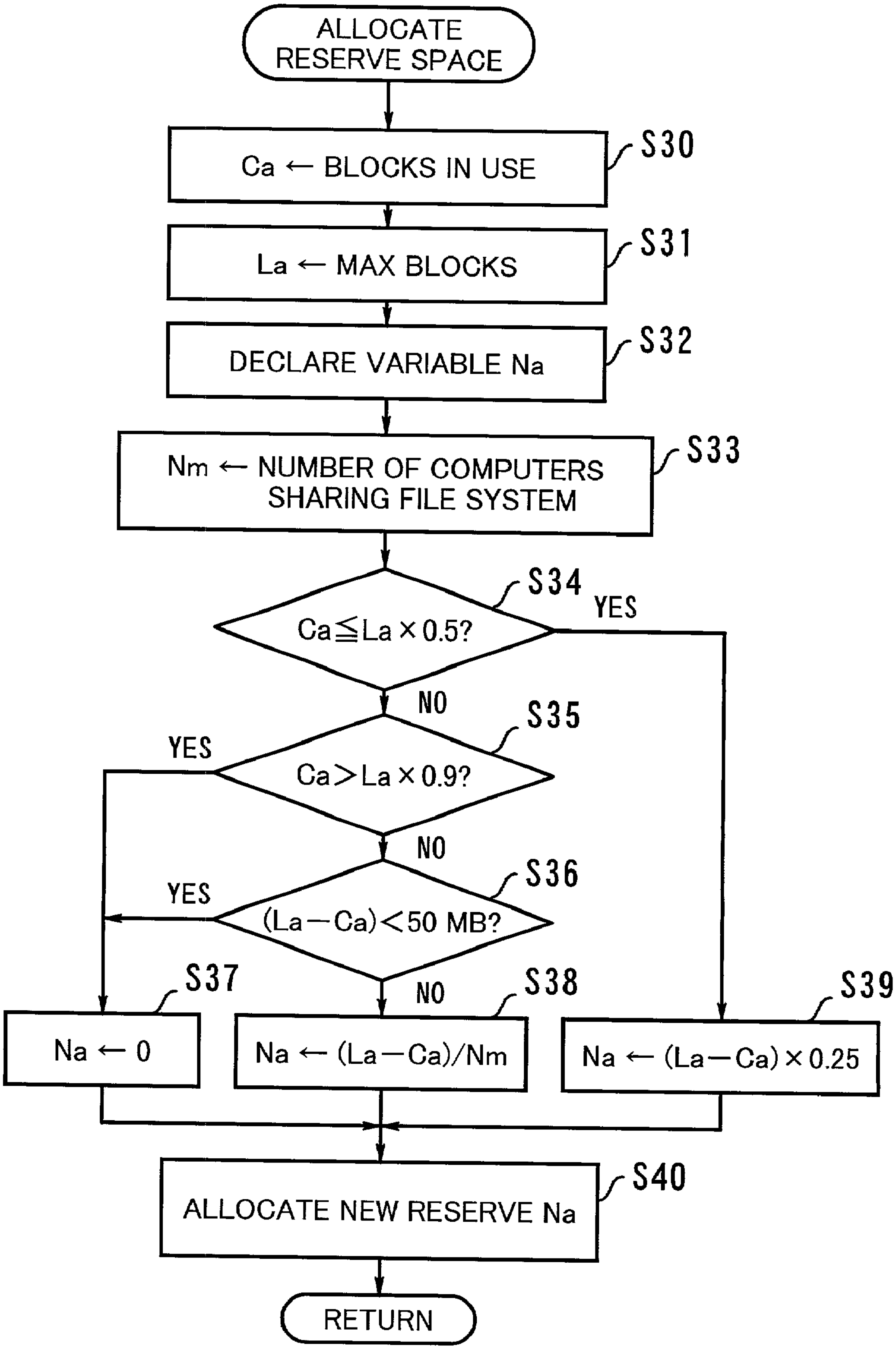
FIG. 6 is a flowchart of a process executed by the shared file management subsystem shown in FIG. 2.
Figure 7:
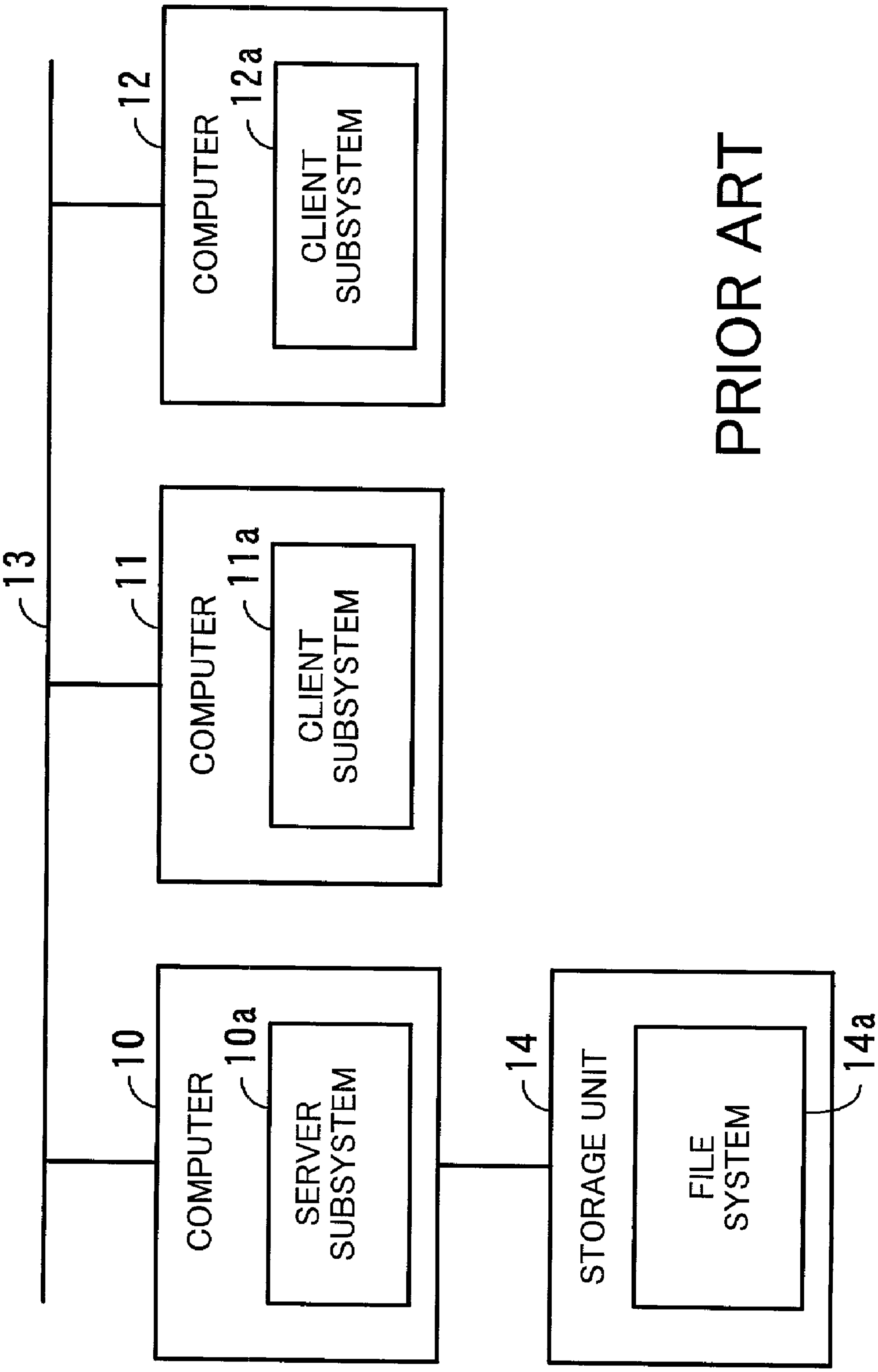
FIG. 7 shows a typical configuration of a conventional distributed processing system.
Figure 8:
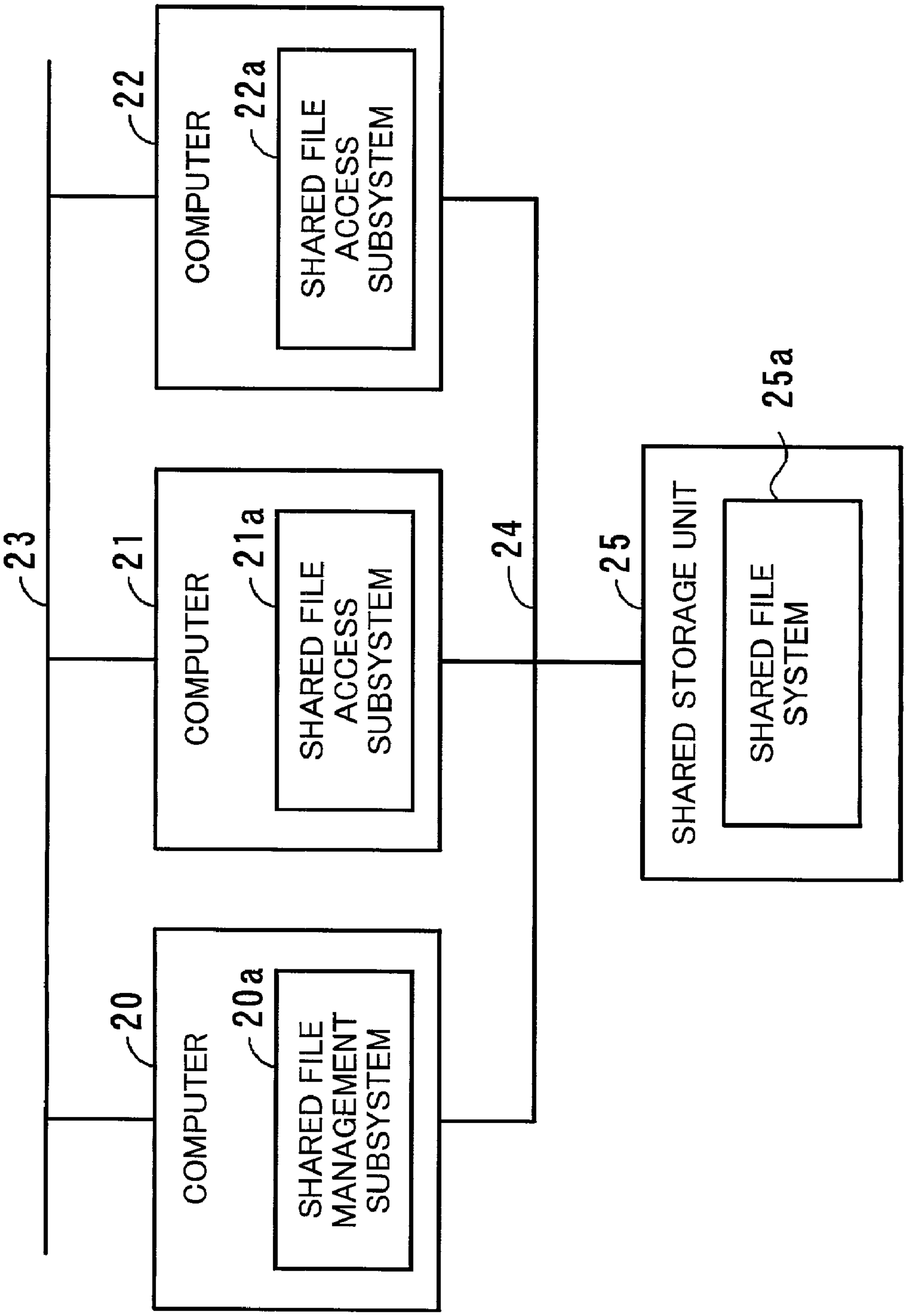
FIG. 8 shows another typical configuration of a conventional distributed processing system.

Referring next to FIG. 6, the process of allocating a reserve space will be described in detail. Being triggered by the requesting computer at step S15 of FIG. 5, the shared file management subsystem 40*a* executes the following steps.

(S30) Regarding the storage quota of the requesting user, the shared file management subsystem 40*a* assigns the number of used blocks to a variable Ca.

(S31) The shared file management subsystem 40*a* assigns the number of maximum usable blocks to a variable La.

(S32) The shared file management subsystem 40*a* declares a variable Na representing the value of a reserve space to be calculated from now.

(S33) The subsystem 40*a* assigns the number of computers sharing the file system to a variable Nm.

(S34) The subsystem 40*a* determines whether the variable Ca (number of used blocks) is not greater than half the value of La (maximum number of usable blocks). If this is true, the process branches to step S39. Otherwise, the process advances to step S35.

(S35) The subsystem 40*a* determines whether the variable Ca (number of used blocks) is greater than 0.9 times the value of La (maximum number of usable blocks). If this is true, the process branches to step S37. Otherwise, the process advances to step S36.

(S36) The subsystem 40*a* determines whether the difference between La (maximum number of usable blocks) and Ca (number of used blocks) is less than 50 MB. If this is true, the process branches to step S37. Otherwise, the process advances to step S38.

(S37) The subsystem 40*a* assigns zero to the variable Na (new reserve size), thus advancing the process to step S40 without allocating a reserve to the requesting computer. This step S37 corresponds to what has been described earlier as the Rule (3).

(S38) The subsystem 40*a* divides the difference between La (maximum number of usable blocks) and Ca (number of used blocks) by Nm (number of computers) and assigns the result to the variable Na (new reserve size). The process then advances to step S40. This step S38 corresponds to what has been described earlier as the Rule (2).

(S39) The subsystem 40*a* assigns one quarter of the difference between La (maximum number of usable blocks) and Ca (number of used blocks) to the variable Na (new reserve size). The process then advances to step S40. This step S39 corresponds to what has been described earlier as the Rule (1).

(S40) The subsystem 40*a* subtracts Na from the remaining storage quota of the user, thus allocating a new reserve to the requesting computer. It then exits from the routine of FIG. 6 and returned to the previous processing.

The processes shown in the flowcharts of FIGS. 5 and 6 embody a distributed processing method of the present invention. Although the above section has explained a specific algorithm for calculating an appropriate reserve space, the present invention should not be limited to that particular implementation. Rather, the reserve space allocation algorithms, including the values of thresholds and parameters, may vary to meet the specific requirements in each individual system. One of the key features to accomplish the object of the present invention is that the reserve space is dynamically determined according to the amount of each user's current free storage quota.

While the above-described embodiments employ a reserve space allocation algorithm based on the storage quota, or the maximum number of usable blocks, of each individual user, it is not intended to limit the present invention to that algorithm. The present invention may also be implemented with an algorithm based on the maximum number of usable files.

In some implementations, the storage quota control functions may be disabled initially and activated in the middle of the system operations. In such cases, the proposed system cannot work immediately because it needs the information about each user's current usage of shared storage to determine the amount of a reserve space. This means that a special care should be taken when newly activating the system's storage quota control functions. The next section will focus on this issue.

One possible option is that the system does not manage the current usage of its shared file system on an individual user basis, until the storage quota control function is enabled. In this case, however, the system will have to scan all the existing shared files to collect and summarize their ownership attributes, when activating the storage quota control function. This is not a practical solution because, in real life, distributed processing systems have an enormous number of data files in their shared storage units. For this reason, it is recommended to configure the system to keep track of the current usage of its shared file systems even when the storage quota control function is disabled. When activating the control function, the shared file management subsystem notifies all shared file access subsystems within the system of the commencement of storage quota control. Upon receipt of this notification, the shared file access subsystems reconfigure themselves so that they will claim the latest usage of the shared storage space (if it has not yet been claimed) before they request the shared file management subsystem to allocate a reserve space. The above mechanism permits the shared file management subsystem to control the storage quota limits correctly and effectively, when it is activated.

The proposed processing mechanisms are actually implemented as software functions of a computer system. The process steps of the proposed distributed processing systems are encoded in a computer program, which will be stored in a computer-readable storage medium. The computer system executes this program to provide the intended functions of the present invention. Suitable computer-readable storage media include magnetic storage media and solid state memory devices. Other portable storage media, such as CD-ROMs and floppy disks, are particularly suitable for circulation purposes. Further, it will be possible to distribute the programs through an appropriate server computer deployed on a network. The program file delivered to a user is normally installed in his/her computer's hard drive or other local mass storage devices, which will be executed after being loaded to the main memory.

The above discussion is summarized as follows. According to the present invention, the storage quota management unit manages each user's storage quota, which limits the total amount of data that the user can store on the shared storage unit. When a write request to the shared storage unit is issued at a certain computer, the user identification unit identifies the requesting user. Then the free quota calculation unit calculates the remaining free storage quota of the user. Based on this free storage quota, the reserve space allocation unit allocates an appropriate reserve space to the computer. The computer can use the allocated reserve space at its discretion to handle the user's data write request. Besides providing an optimal amount of reserve space to each computer, the proposed system eliminates the interactions among the computers, thus realizing high-speed access to the shared file system.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A distributed processing method which controls access to a shared storage unit shared by a plurality of computers, the method comprising:

managing a storage quota of each user, the storage quota limiting the total amount of data that each user is allowed to store on the shared storage unit;

identifying a particular user who has issued a write request from one of the plurality of computers in an attempt to store data into the shared storage unit;

calculating a free storage quota of the particular user identified; and allocating, to the one of the plurality of computers issuing the write request, a reserve space as part of the free storage quota calculated, the reserve space being an amount of storage space on the shared storage unit which is to be managed at the discretion of the one of the plurality of computers issuing the write request, wherein a requesting computer executes another write request from a same user without being allocated a new reserve space as long as a data size of the another write request does not exceed a remaining reserve space.

2. A distributed processing system which has a shared storage unit shared by a plurality of computers, the system comprising:

storage quota management means for managing a storage quota of each user, the storage quota limiting the total amount of data that each user is allowed to store on the shared storage unit;

user identification means for identifying a particular user who has issued a write request from one of the plurality of computers in an attempt to store data into the shared storage unit;

free quota calculation means for calculating a free storage quota of the particular user identified by said user identification means; and reserve space allocation means for allocating, to the one of the plurality of computers issuing the write request, a reserve space as part of the free storage quota calculated by said free quota calculation means, the reserve space being an amount of storage space on the shared storage unit which is to be managed at the discretion of the one of the plurality of computers issuing the write request, wherein the requesting computer consumes the received reserve space on the shared storage unit in executing the write request, and the requesting computer executes another write request from the same user without the need for being allocated a new reserve space by said reserve space allocation means, as long as data size of the new write request does not exceed the remaining reserve space.

3. The distributed processing system according to claim 2, wherein:

said reserve space allocation means allocates the reserve space as a predetermined amount of space out of the free storage quota, when the free storage quota exceeds a predetermined threshold; and said reserve space allocation means allocates the reserve space as a fraction (1/N) of the free storage quota to the requesting computer, when the free storage quota falls below the predetermined threshold, where N is the number of computers in the system.

4. The distributed processing system according to claim 3, wherein said reserve space allocation means allocates a null reserve space, when the free storage quota falls below another predetermined threshold.

5. The distributed processing system according to claim 2, wherein:

said storage quota management means further manages a storage quota for each group of users; and said free quota calculation means calculates the free storage quota of the group to which the identified user belong.

6. The distributed processing system according to claim 2, wherein:

said storage quota management means is deactivated initially; and when said storage quota management means is brought into an active state, each of the computers reports to said storage quota management means the amount of storage space in the shared storage unit that is not reported yet but currently used by each user.

7. The distributed processing system according to claim 2, wherein said storage quota management means, user identification means, free quota calculation means, and reserve space allocation means are disposed in one of the plurality of computers that is assigned a role of quota management, and the one of the plurality of computers issuing the write request receives the reserve space from said managing computer.

8. A distributed processing method which controls access to a shared storage unit shared by a plurality of computers, comprising:

identifying a particular user who has issued a write request from one of the plurality of computers in an attempt to store data into the shared storage unit;

calculating a free storage quota of the identified user; and allocating a reserve space as cart of the free storage quota, the reserve space being an amount of storage space on the shared storage unit which is to be managed at the discretion of the one of the plurality of computers issuing the write request, wherein the requesting computer executes another write request from a same user without being allocated a new reserve space as long as a data size of the another write request does not exceed remaining reserve space.

9. The distributed processing system according to claim 8 wherein one of the plurality of computers is assigned a role of quota management, and each one of the plurality of computers issuing the write request receives the reserve space from said managing computer.

* * * * *

UNITED STATES PATENT AND TRADEMARK OFFICE

CERTIFICATE OF CORRECTION

PATENT NO. : 7,017,016 B2
APPLICATION NO. : 09/815056
DATED : March 21, 2006
INVENTOR(S) : Yoshihisa Chujo et al.

It is certified that error appears in the above-identified patent and that said Letters Patent is hereby corrected as shown below:

Column 12, line 23, after “does not exceed” delete “the”.
Column 13, line 8, change “cart” to --part--.

Signed and Sealed this

Twenty-second Day of August, 2006

JON W. DUDAS
*Director of the United States Patent and Trademark Office*